United States Patent [19]
Llop et al.

[11] 3,737,617
[45] June 5, 1973

[54] EXPOSURE CONTROL APPARATUS FOR AN ELECTRON MICROSCOPE

[75] Inventors: Helenio Llop, Creteil; Pierre Lefort, Fontenay-sous-Bois, both of France

[73] Assignee: Societe D'Optique, Precision Electronique Et Mecanique-Sopelem, Paris, France

[22] Filed: May 10, 1971

[21] Appl. No.: 141,798

[52] U.S. Cl. ..........250/49.5 E, 250/83.3 R, 250/105
[51] Int. Cl. .............................................H01j 37/26
[58] Field of Search ........................250/49.5 E, 105, 250/83.3

[56] References Cited

UNITED STATES PATENTS 3,137,791   6/1964   Gutter.............................250/49.5 E
2,629,824   2/1953   MacKay............................250/83 R

OTHER PUBLICATIONS

"Rate Measurements" Nucleonics, Oct. 1959 pp. 66, 67.
"Direct Reading Grenz Ray Dosimeter" by Weisbecker et al. Electronics, October 1954 page 168.

*Primary Examiner*—James W. Lawrence
*Assistant Examiner*—Harold A. Dixon
*Attorney*—Cameron, Kerkam & Sutton

[57] ABSTRACT

Apparatus for indicating and/or controlling the exposure time of photographic material exposed to the electron beam of an electron microscope includes an electron impermeable, insulated conductive screen which may be positioned to intercept a part at least of the electron beam. The current flowing to the screen may be measured to indicate required exposure time. Alternatively the voltage across a resistor in the current path may be stored and integrated to yield a signal for indicating that exposure should be terminated. The signal may be used to produce termination of exposure.

3 Claims, 3 Drawing Figures

EXPOSURE CONTROL APPARATUS FOR AN ELECTRON MICROSCOPE

The invention relates to an exposure control apparatus for an electron microscope whose images are recorded photographically, the apparatus being intended in particular to permit the exposure of the sensitized plate to be automatically terminated.

Various devices with photoelectric cells are known which measure the brightness of the image formed by the electron beam of a microscope of this type. These photoelectric cell devices have the disadvantage, for an electron microscope, of lacking precision and of being highly sensitive to stray light due to the low energy level received by the sensitized plate, especially in the case of high magnifications.

According to the present invention, there is provided exposure indicating and/or control apparatus for an electron microscope of which the image is photographically recorded, comprising an insulated conductor screen movable between an intercepting position in which it is situated in the path of the electron beam of the microscope and an inoperative position in which it does not intercept the beam, together with means for indicating or responding to the electric current received by said screen when in said intercepting position.

It will be shown that exposure control apparatus in accordance with the invention may provide a highly precise determination of the exposure time independently of any stray light and that the sensitivity of the photographic plate may be taken into account.

Preferred features and advantages of an embodiment of the invention will be understood from the following description taken in conjunction with the accompanying drawings, of which:

FIG. 1 shows a cross-sectional plan view of the observation chamber 2 of an electron microscope, the section being taken in a plane perpendicular to the direction of the electron beam and slightly above the support for the photoelectric plate. The interior of the chamber, of course, is arranged to be evacuated.

Figure 1:
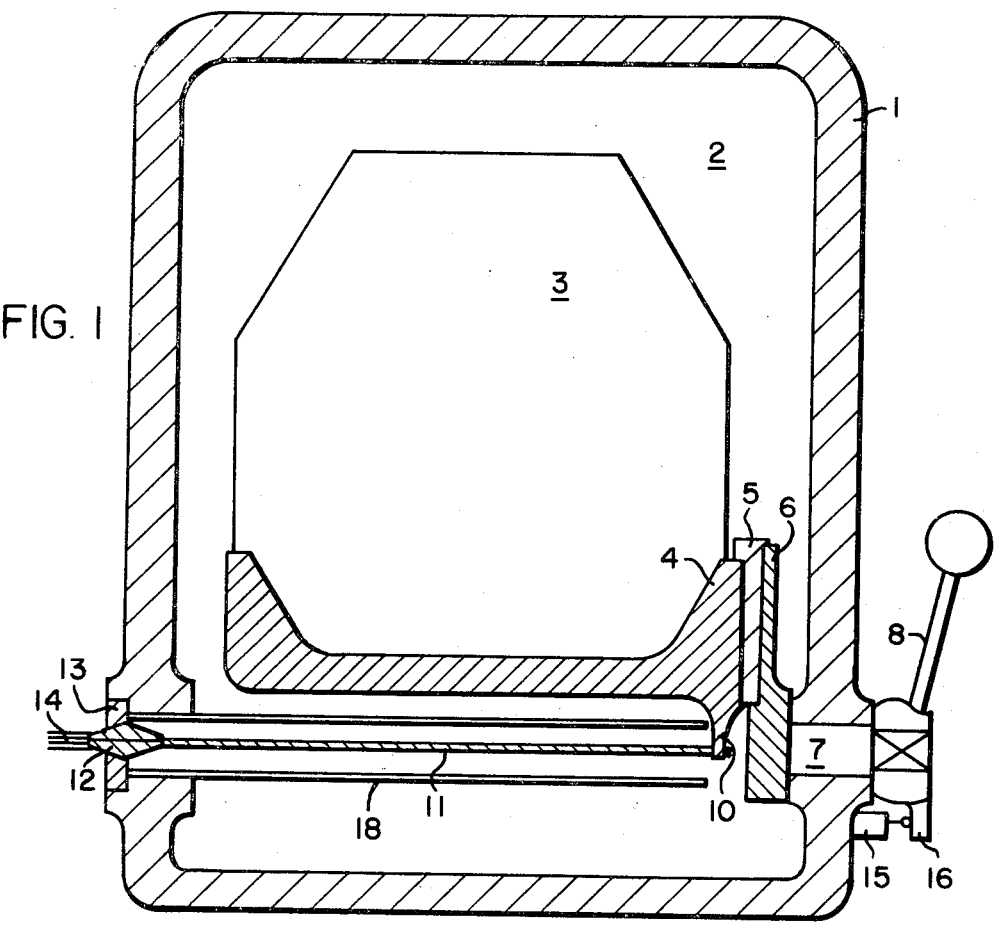
FIG. 1 is a simplified view of the device for operating the metal screen and its electrical connection to the measuring apparatus outside the microscope.

In accordance with the invention there is provided within the microscope housing 1 an insulated conductive screen movable between an intercepting position in which it is situated in the path of the electron beam and an inoperative position in which it does not intercept the beam. In the present embodiment the apparatus comprises a metallised fluorescent screen 3 held in a metal mounting 4 fixed through the intermediary of an insulating member 5 to a lever 6, which is secured to a shaft 7 extending through the wall 1 of the chamber of the apparatus. A handle 8 is fixed to the other end of the shaft 7, outside the chamber wall 1, and enables the screen 3 to be turned on the axis of shaft 7. Obviously, the bearing for the shaft 7 which is provided in the wall includes conventional vacuum sealing devices (not shown).

The plate mounting 4 is provided with an extension 10, and a conductor wire 11 is stretched between this extension 10 and a lead-through insulator 12 fixed in the chamber wall 1 at 13. The conductor wire 11 is exactly coaxial with the shaft 7 and is electrically connected through the insulator 12 to an external conductor 14. A two-pole switch 15 fixed to the outside of the wall 1 is operated in certain positions of handle 8 by an extension 16 provided on the handle. A tubular shield 18 connected to the apparatus earth surrounds and is coaxial with the wire 11.

In the position shown in FIG. 1, the screen 3 masks the sensitized plate, and intercepts the whole of the electron beam of the microscope, which forms on the screen an image which can be observed directly. When the image formed is that which the operator wishes to record on the photographic plate, he simply operates the handle 8 to move the screen 3 out of the path of the electron beam, turning it through 90° about the axis of shaft 7 into a position parallel to the electron beam, which then produces an image on the sensitized plate revealed by moving the screen. Alternatively, screen 3 may be arranged to intercept a part only of the electron beam. Preferably, though not essentially, screen 3 is arranged to be positioned substantially in the image plane of the electron beam and forms a shutter for the photographic chamber of the electron microscope.

It will be noted that this operation does not affect the position of the wire 11 in the shield 18. Also, with the arrangement described the wire 11 can be long enough to undergo only slight twisting, which does not affect its capacitance relative to the shield 18.

Figure 2:
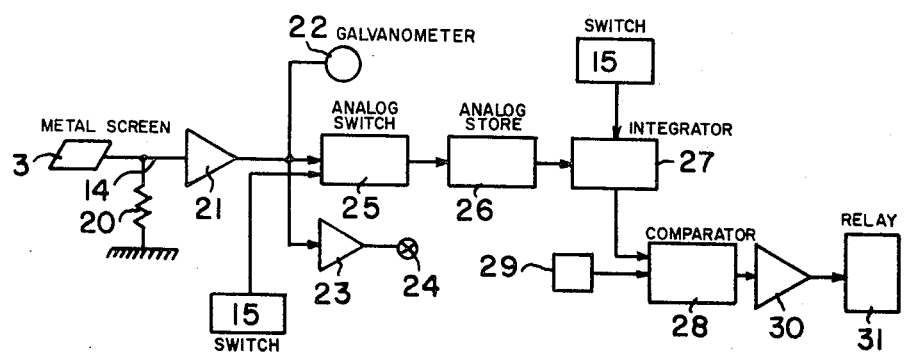
FIG. 2 is an operating diagram for the measuring apparatus used with a voltage/time converter.

Referring now to FIG. 2, it will be seen that the lead 14 connects the metal screen 3 to earth by way of a resistor 20. The electron current which is received by the screen 3, and which is proportional to the brightness of this observation screen, is discharged through the resistor 20 and produces across this resistor a voltage which is also proportional to the brightness of the observation screen. This voltage is fed into an amplifier 21 having a very high input impedance, of the order of at least 10 times the resistance value of the resistor 20. The output voltage from the amplifier 21 is fed simultaneously to a galvanometer 22, which gives a direct reading for the brightness value, to a comparator 23 in which it is compared with a reference voltage and operating a visual indicator 24, and to an analog switch 25 operating a unit which will now be described.

The switch 25 feeds the output voltage from the amplifier 21 to an analog store 26, which is connected in turn to an integrator 27. Operation of the integrator 27 is effected by the second contact of switch 15 when this is operated by moving the handle 8. The output signal from the integrator 27 is fed to a further comparator 28. The further comparator 28 also receives a variable reference voltage of which the value may be varied by means of a selector switch 29 to suit the sensitivity of the photographic plate which is being used. The output signal from the comparator 28 is arranged to actuate an indicating means denotive of the end of the required exposure time or a control means by which exposure is terminated. In the present embodiment the amplifier output signal drives, by way of an amplifier 30, a relay 31 which stops the exposure of the sensitized plate to the electron beam. For example, by means of known arrangements, the relay 31 may cause the pivoting of the screen 3 into its intercepting position, the interposition of a diaphragm in the beam path, or the magnetic extinction of the electron beam. Alternatively, the relay 31 may operate an audible or visual alarm to indicate that the taking of the photograph had ended.

Figure 3:
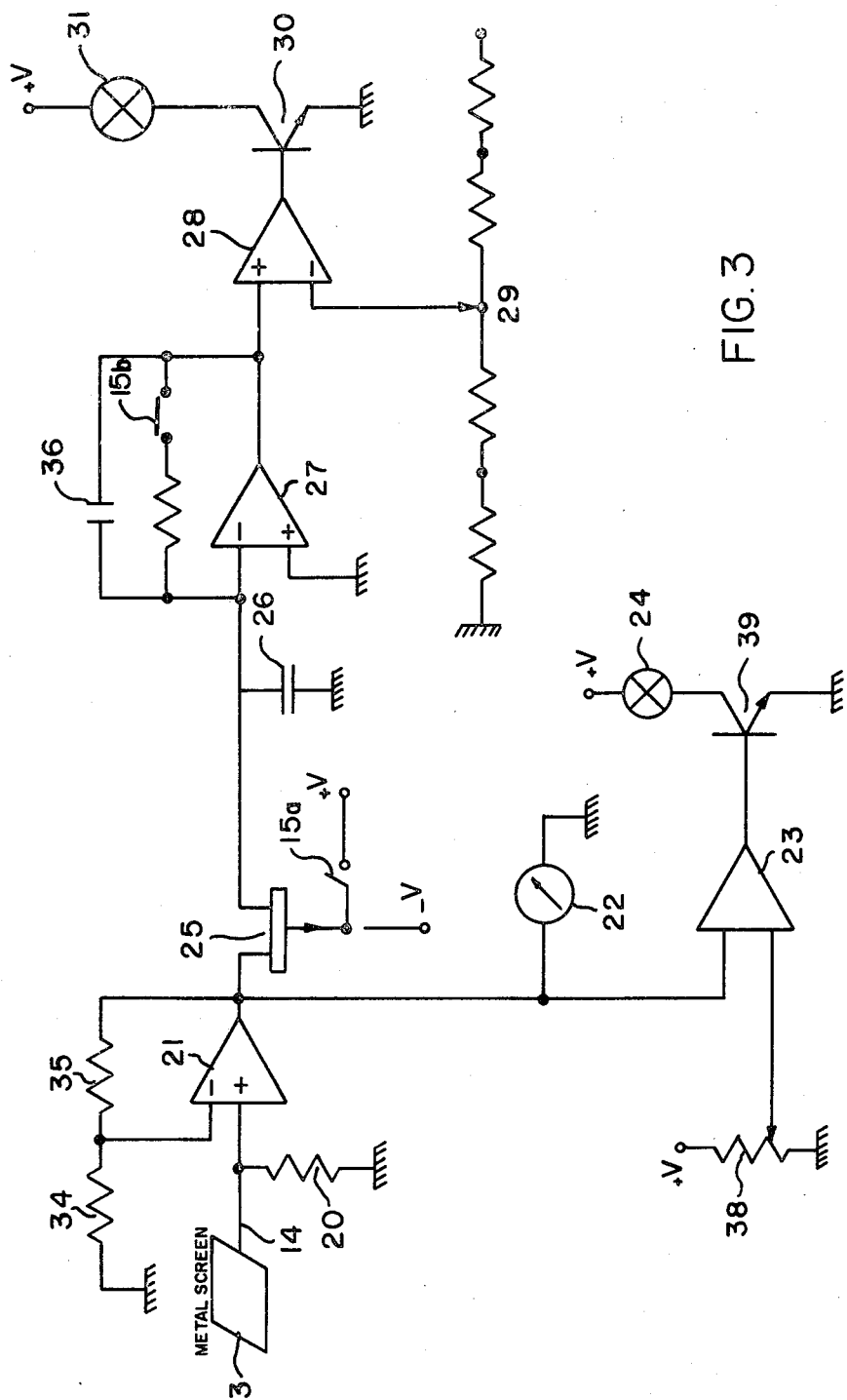
FIG. 3 is a simplified illustration of how this operating diagram may be realised.

In the practical embodiment of a circuit arrangement for carrying out the invention which is shown in FIG. 3, resistances 34 and 35 provide a negative feedback path for amplifier 21 which determines the gain of the amplifier. The switch 25 is here formed by a field-effect transistor which is turned on when a switch contact 15a opens to remove a positive turn-off bias from the gate electrode of the transistor. The store 26 is a capacitor. The integrator 27 is formed by an operational amplifier provided with feedback paths including an integrating capacitor 36, which is discharged through a resistor 37 when switch contact 15b is closed. The amplifier 30 is a transistor and the relay 31 is here shown simply as a signal lamp. The further comparator 28 receives its reference voltage from a selector switch 29 by which the reference input of the comparator is connected to an appropriate tapping of a voltage divider fed from a constant-voltage source (not shown). In this case the reference voltage for the comparator 23 is set by a potentiometer 38. The visual indicator 24 is operated by the output from the comparator 23 by means of switching a transistor 39.

During the observation period preceding the taking of a photograph, the screen 3 is positioned in front of the sensitized plate and a visible image is formed on the screen. In this position, the switch 15a is open and the switching field-effect transistor 25 allows the capacitor 26 to charge up to the output voltage from the amplifier 21, this voltage representing the brightness, at that particular moment in time, of the image formed. When the operator decides to take a photograph, he tilts the screen 3 with the handle 8, so closing the contact 15a and cutting off the transistor 25. The charge on the capacitor 26, which cannot now change, therefore represents and stores the luminosity of the image at the moment when it is about to be photographed. The same movement of the handle 8 which tilts the screen 3 out of the way also opens the switch contact 15b, initiating integration with respect to time of the voltage stored in the capacitor 26. The output voltage from the integrator amplifier 27 increases linearly as a function of time until it reaches a reference voltage, pre-set by the selector switch 29 to suit the sensitivity of the photographic plate. When the integrated voltage reaches the level fixed by the selector 29, the comparator 28 provides an output signal to drive the transistor 30, which switches on the signal lamp 31. In this simplified version, the signal lamp 31 informs the operator that the exposure should be terminated. Alternatively, of course, the transistor 30 may actuate some suitable known means which automatically ends the exposure.

The comparator 23, followed by the transistor 39, indicates any excess charge by means of the visual indicator 24, for example if the brightness of the screen, and, therefore, the voltage at the output of the amplifier 21, is no longer compatible with satisfactory operation of the apparatus. The reference adjustment of the comparator is effect by the potentiometer 38.

Alternatively, the exposure meter described may be used in a completely manual fashion. In this case the exposure time will be chosen by the operator according to the reading on the galvanometer 22, whose deflection is proportional to the brightness. Obviously, only the components 3, 14, 20, 21 and 22 of FIG. 2 are then necessary.

The details of the embodiment described do not strictly limit the invention and may be modified without exceeding the scope of the invention. For example, an analog-to-digital conversion may be performed at the output of the amplifier 21 and the information obtained may then be used in digital form, to provide greater accuracy. Also, the output voltage of the integrator may be compared with a stored voltage, or the sensitivity may be displayed by means of a potentiometer.

What we claim is:

1. Exposure indicating apparatus for an electron microscope photographically recording the image and measuring the level of energy received by the photosensitive plate to determine the optimum time of exposure of the plate comprising a metallic screen insulated from earth and pivotally mounted around an axis between a position intercepting the entire electron beam in the image plane and closing the photographic chamber and an inoperative position passing the entire electron beam, a resistance connected to said screen and measuring means connected across said resistance measuring the current received by said screen and flowing through said resistance, the electrical connection between said screen and said resistance being a long conductor wire under tension disposed in the pivotal axis of said screen.

2. Apparatus in accordance with claim 1 wherein said responsive means includes an amplifier with a high input impedance, to the input of which said potential is applied, means for storing the amplifier output signal and for applying the stored signal to a voltage/time converter, and wherein a device for bringing the screen into its inoperative position simultaneously initiates the exposure of the sensitized plate and operates the operation of the voltage/time converter, and means responsive to the output signal of the voltage/time converter for causing the exposure of the sensitized plate to be terminated.

3. Apparatus in accordance with claim 2, wherein the voltage/time converter comprises an integrator for integrating the output signal of the amplifier with respect to time, a voltage comparator arranged to compare the integrator output and with a fixed and adjustable voltage, and indicating or control means arranged to be actuated by the output signal from the voltage comparator.

* * * * *